(12) United States Patent
Tveito et al.

(10) Patent No.: US 7,625,003 B2
(45) Date of Patent: Dec. 1, 2009

(54) TRACTOR DRAWBAR ASSEMBLY

(75) Inventors: David L. Tveito, West Fargo, ND (US); Russell V. Stoltman, Argusville, ND (US); Bob J. Overmann, Fargo, ND (US); John T Rasset, Barnesville, MN (US)

(73) Assignee: CNH America LLC, New Holland, PA (US)

( * ) Notice: Subject to any disclaimer, the term of this patent is extended or adjusted under 35 U.S.C. 154(b) by 222 days.

(21) Appl. No.: 11/849,761

(22) Filed: Sep. 4, 2007

(65) Prior Publication Data

US 2009/0058042 A1    Mar. 5, 2009

(51) Int. Cl.
*B60D 1/02*    (2006.01)
(52) U.S. Cl. ..................... 280/515; 280/462
(58) Field of Classification Search ................. 280/515, 280/462, 502
See application file for complete search history.

(56) References Cited

U.S. PATENT DOCUMENTS

| | | | | |
|---|---|---|---|---|
| 1,906,322 A | * | 5/1933 | Livesay | 180/14.1 |
| 2,495,818 A | * | 1/1950 | Oerman | 280/486 |
| 2,950,927 A | * | 8/1960 | Hendrickson | 280/462 |
| 4,420,169 A | * | 12/1983 | Taylor | 280/446.1 |
| 5,921,699 A | * | 7/1999 | Olson | 403/322.1 |
| 5,988,000 A | * | 11/1999 | Adams | 73/862.044 |
| 6,739,402 B1 | * | 5/2004 | Olson et al. | 172/272 |
| 6,758,486 B1 | * | 7/2004 | Kollath | 280/515 |
| 7,048,294 B2 | * | 5/2006 | Heitlinger | 280/507 |
| 7,416,206 B2 | * | 8/2008 | Buerkle | 280/515 |
| 7,478,823 B2 | * | 1/2009 | Doubet et al. | 280/515 |
| 7,478,824 B2 | * | 1/2009 | Buerkle et al. | 280/515 |
| 7,516,975 B2 | * | 4/2009 | Lair et al. | 280/515 |
| 7,530,592 B2 | * | 5/2009 | Heitlinger et al. | 280/515 |
| 2008/0100034 A1 | * | 5/2008 | Maillet | 280/515 |

* cited by examiner

*Primary Examiner*—Lesley D Morris
*Assistant Examiner*—Michael R Stabley
(74) *Attorney, Agent, or Firm*—Patrick M. Sheldrake; John William Stader; Michael G. Harms

(57) ABSTRACT

A drawbar assembly includes a drawbar and a hammer strap that is fixed to the drawbar forward of a drawbar hanger.

19 Claims, 7 Drawing Sheets

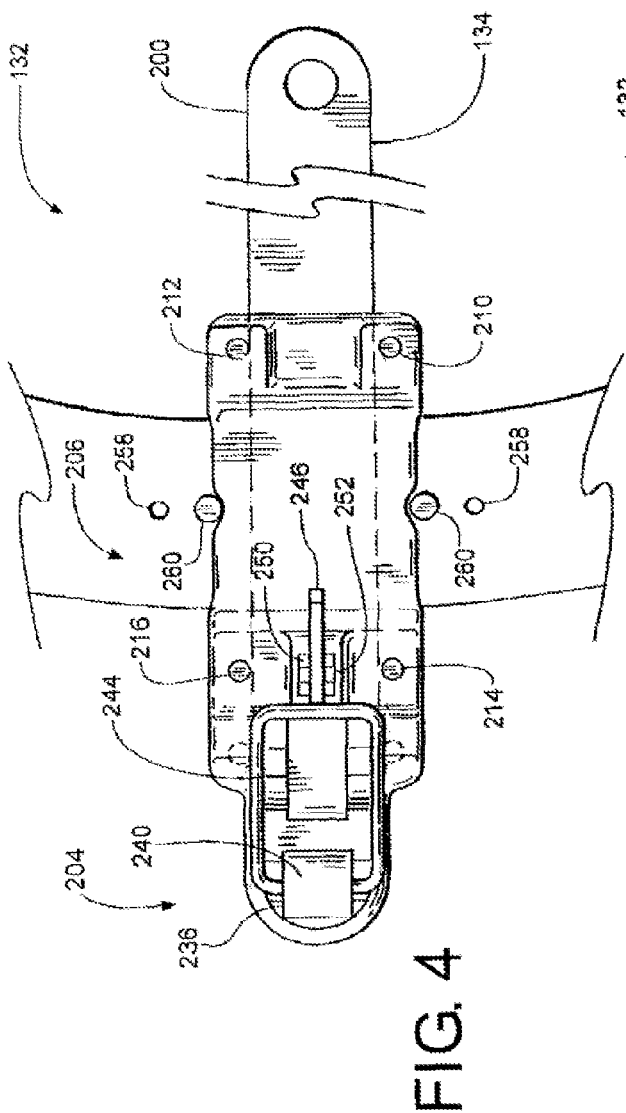

TRACTOR DRAWBAR ASSEMBLY

FIELD OF THE INVENTION

This invention relates generally to agricultural tractors. More particularly, it relates to hitches for agricultural tractors. Even more particularly it relates to drawbar assemblies for agricultural tractors.

BACKGROUND OF THE INVENTION

In recent years, farm tractors have been provided with engines of substantial horsepower that permit them to be used regularly for transporting bulk materials from place to place at higher speeds. This bulk material is usually carried in a bulk carrier, trailer, wagon or other implement that is attached to a drawbar on the back of the tractor. These and similar devices supported by wheels and towed behind the tractor by a tongue are called "implements" herein.

Historically, agricultural tractors were equipped with a drawbar, a long slender member coupled to the chassis of the tractor and extending backward between the two larger wheels to a point at which it could be coupled to the implement's tongue. In the traditional design, the drawbar consists of an elongate steel bar having a hole at the rear end in which a hitch pin can be inserted to couple the implement tongue to the drawbar. The drawbar also had a hole in the forward end through which a bolt is passed to attach the drawbar to the chassis of the tractor.

As horsepower increased on tractors, however, the stress and strain on the pin coupling the implement tongue to the drawbar became a problem. The pins tended to wear and break under the high shear forces applied to the implement tongue.

One effort to prevent this problem was to provide an add-on reinforcing strap that could be bolted to the top surface of the drawbar near its rearward end. This add-on strap was typically made of the same bar stock from which the drawbar was made. It had an "S"-bend in the middle such that when the forward end was bolted to the drawbar, the rear end of the add-on strap was parallel to end spaced apart from the drawbar, forming a gap therebetween in which the tongue of the implement could be inserted.

The drawbar and the add-on strap (also called a "hammer strap" or "clevis"), had holes therethrough through which a pin could be inserted first to the hammer strap, then through the tongue of the implement, and then into the drawbar itself. By supporting the pin on each end, the drawbar with hammer strap distributed the implement load on the tongue to two holes, and not just one through the drawbar. This permitted the drawbar to be used to tow much larger loads with much less wear and fatigue. An example of one of these early drawbars can be seen in U.S. Pat. No. 2,654,613, which issued to Blair et al. on Mar. 28, 1952. This solution, however, was not without its own problems. The drawbar was substantially weakened by stress concentrations formed when the holes necessary for attaching the hammer strap to the drawbar were drilled through the drawbar.

As tractor horsepower has further increased, the tongue loads applied to drawbars have continued to increase. The previous solutions are inadequate and new structures for stiffening or reinforcing the drawbar, hammer strap and drawbar hanger are needed.

SUMMARY OF THE INVENTION

Accordingly, an object of this invention is to provide a drawbar assembly which has superior load distribution and more resistance to bending stress. Another object is to provide a combined yoke and hammer strap. This and other objects are achieved by the present drawbar assembly in which a drawbar assembly includes a drawbar and a hammer strap that extends forward along the drawbar. The hammer strap may extend forward along the drawbar some distance. It may extend over the top of the drawbar hanger. It may be bolted to the drawbar ahead of the drawbar hanger. The hammer strap may extend outwardly beyond the lateral edges of the drawbar and may be fixed to the drawbar by bolts, which may extend between the hammer strap and two anchor plates on either side of the drawbar.

In accordance with a first aspect of the invention, a tractor drawbar assembly for a tractor having a drawbar hanger is provided, the assembly comprising: an elongate drawbar having a rear end with a hole configured to receive a lower end of a hitch pin, and a front end pivotally coupled to a tractor chassis; and a unitary hammer strap having a front portion and a rear portion, wherein the front portion is fixed to the drawbar forward of the drawbar hanger and the rear portion is configured to receive an upper end of the hitch pin while leaving a central portion of the hitch pin exposed for coupling to a towed implement.

The hammer strap may have a central portion disposed between the front portion and the rear portion that is fixed to the drawbar to the rear of the drawbar hanger. The hammer strap may define a laterally extending recess configured to receive the drawbar hanger. The drawbar assembly may further include the drawbar hanger itself, the hanger having a bottom surface and a top surface; and a laterally extending brace fixed to the bottom surface of the drawbar hanger on both sides of the drawbar. The laterally extending brace may define a recess configured to receive the drawbar and the drawbar assembly may further include a left upper brace fixed to the top surface of the drawbar hanger on the left side of the drawbar; and a right upper brace fixed to the top surface of the drawbar hanger on the right side of the drawbar. The drawbar may have left and right sides and the assembly may also include a front plate abutting a bottom surface of the drawbar and fixed to the front portion of the hammer strap with bolts extending through first ones of the plurality of vertical recesses, the bolts being recessed into at least one side of the drawbar; and a rear plate abutting a bottom surface of the drawbar and fixed to the rear portion of the hammer strap with bolts extending through second ones of the plurality of vertical recesses, the bolts being recessed into at least one side of the drawbar.

In accordance with a second aspect of the invention, a drawbar assembly for a work vehicle is provided, including a longitudinally-extending drawbar having a rear end with a hole configured to receive a hitch pin, and a front end configured to be coupled to the work vehicle and disposed beneath and perpendicular to an arcuate drawbar hanger; and a hammer strap having a front portion and a rear portion, wherein the front portion is fixed to the drawbar forward of the drawbar hanger, and the rear portion is configured to receive the hitch pin, and is fixed to the drawbar, the rear portion being spaced away from the rear end of the drawbar to provide a central exposed portion of the hitch pin.

The hammer strap may include a central portion disposed between the front portion and the rear portion that is fixed to the drawbar to the rear of the drawbar hanger. The hammer strap may define a laterally extending recess configured to receive the drawbar hanger. The drawbar assembly may also include the drawbar hanger itself, the hanger having a bottom surface and a top surface; and a laterally extending brace fixed to the bottom surface of the drawbar hanger on both sides of the drawbar. The laterally extending brace may define a recess configured to receive the drawbar, and the drawbar assembly may further include a left upper brace fixed to the top surface of the drawbar hanger on the left side of the drawbar; and a right upper brace fixed to the top surface of the drawbar hanger on the right side of the drawbar. The drawbar may have left and right sides, and the drawbar assembly may also include a front plate abutting a bottom surface of the drawbar and fixed to the front portion of the hammer strap; and a rear plate abutting a bottom surface of the drawbar and fixed to the rear portion of the hammer strap.

In accordance with a third aspect of the invention, a drawbar assembly for a work vehicle is provided, including a longitudinally-extending drawbar having a rear end configured to receive a hitch pin, and a front end configured to be coupled to the work vehicle, and a unitary hammer strap having a front portion and a rear portion, wherein the front portion is bolted to the drawbar at a location forward of a drawbar hanger, and the rear portion is configured to receive the hitch pin, the rear portion being spaced away from the rear end of the drawbar to provide a central exposed portion of the hitch pin.

The hammer strap may include a central portion disposed between the front portion and the rear portion that is fixed to the drawbar to the rear of the drawbar hanger. The hammer strap may define a laterally extending recess configured to receive the drawbar hanger. The drawbar assembly may also include the drawbar hanger itself, the hanger having a bottom surface and a top surface; and a laterally extending brace fixed to the bottom surface of the drawbar hanger on both sides of the drawbar. The laterally extending brace may define a recess configured to receive the drawbar, and the drawbar assembly may further include a left upper brace fixed to the top surface of the drawbar hanger on the left side of the drawbar; and a right upper brace fixed to the top surface of the drawbar hanger on the right side of the drawbar. The drawbar may have left and right sides, and the assembly may include a front plate abutting a bottom surface of the drawbar and fixed to the front portion of the hammer strap; and a rear plate abutting a bottom surface of the drawbar and fixed to the rear portion of the hammer strap. The hitch pin may include a pin portion and a handle portion pivotally coupled to the pin portion, and further wherein the drawbar assembly further comprises a releasable latch configured to lock the handle portion. The latch may include a latch member pivotally coupled to the hammer strap.

BRIEF DESCRIPTION OF THE DRAWINGS

FIG. 4 is a top view of the drawbar assembly of FIGS. 1-3.

FIG. 5 is a bottom view of the drawbar assembly of FIGS. 1-4.

DETAILED DESCRIPTION OF THE PREFERRED EMBODIMENTS

In the discussion below, "forward", "front", "reverse", "rear", "aft", "after", "ahead", "behind" and their variants refer to the direction of forward travel of the work vehicle. "Lateral", "side", "side-to-side" and the like refer to directions generally perpendicular to the forward straight-ahead direction of travel of the work vehicle.

Figure 1:
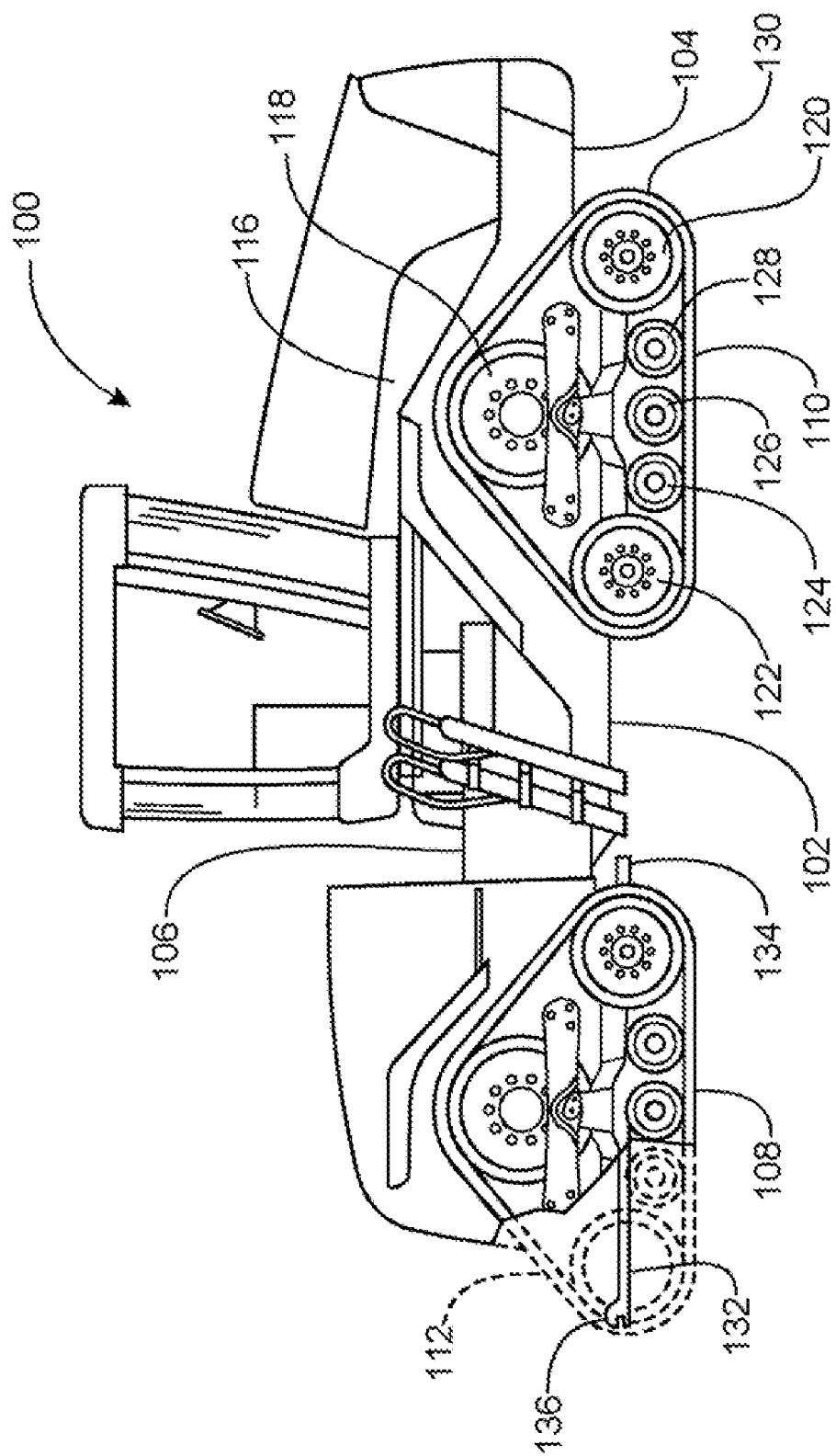
FIG. 1 is a side view of the tractor having the drawbar assembly in accordance with the present invention.
Figure 2:
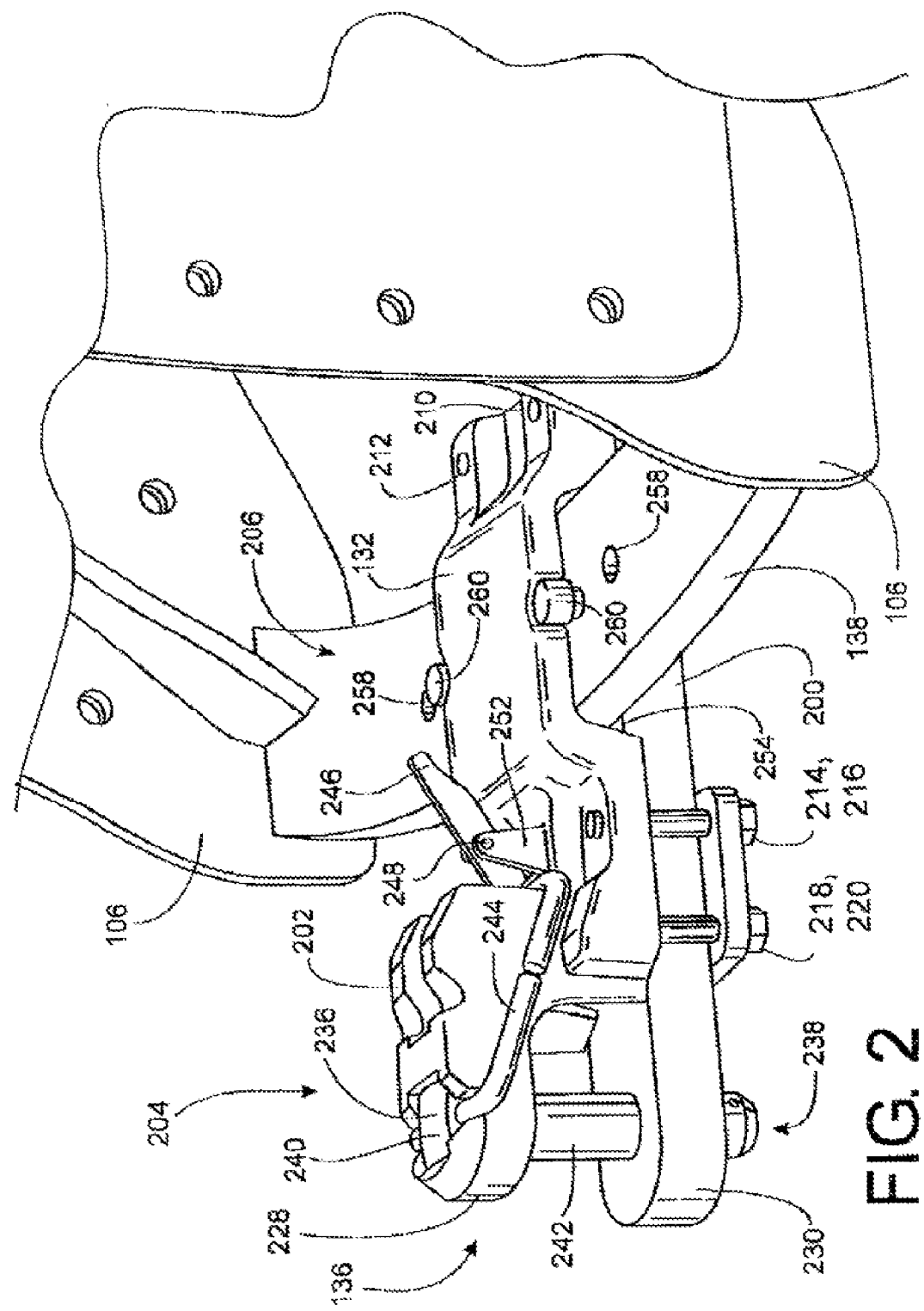
FIG. 2 is a perspective view of the rear of the tractor of FIG. 1 showing the drawbar assembly in greater detail.

Referring to FIGS. 1-2, an agricultural work vehicle, shown here as tractor 100, includes a chassis 102 comprised of a front chassis 104 pivotally coupled to a rear chassis 106. Four track assemblies, including right and left rear track assemblies 108, 112, right front track assembly 110 and a left front track assembly (not shown) are coupled to the chassis to drive the chassis over the ground. In an alternative embodiment, the agricultural work vehicle can be a wheeled tractor, with a rigid chassis, or with front and rear pivoted chassis as shown here.

An engine 116 is fixed to front chassis 104 and drives the four track assemblies.

Each track assembly includes a drive wheel 118, front and rear idler wheels 120, 122, and three broiler wheels 124, 126, 128, as well as an endless reinforced elastomeric track 130 which extends around all the wheels and is driven by the drive wheel 118.

Tractor 100 steers by the pivoting the front chassis 104 with respect to the rear chassis 106. Hydraulic actuators (not shown) coupled to and between the front and rear chassis pivot the chassis with respect to each other.

A drawbar assembly 132 is pivotally coupled at its forward end 134 to chassis 102. Its rearward end 136 extends backward away from the chassis and is disposed between the two rear track assemblies 108 and 112.

Drawbar assembly 132 is supported by a laterally extending and arcuate drawbar hangar 138 which, in turn, is supported at its two ends by rear chassis 106. Drawbar hangar 138 defines an arc with a center point that is located at forward end 134 of drawbar assembly 132.

Referring to FIG. 2-5 drawbar assembly 132 includes an elongated drawbar 200 to which an extended hammer strap 202 is fixed. Hammer strap 202 includes a clevis portion 204, and a saddle portion 206. Hammer strap 202 is fixed to drawbar 200 by a plurality of threaded fasteners including two forward bolts 210, 212, disposed on either side of drawbar 200, and four rear bolts 214, 216, 218, 220 that are disposed in two pairs, with one pair 214, 216 forward and one pair 218, 220 aft, disposed on either side of drawbar 200, and a central rear bolt 219 that is disposed in the middle of the four bolt pattern formed by bolts 214, 216, 218, 220.

Drawbar assembly 132 also includes two anchor plates 222, 224 to which the bottom ends of the plurality of fasteners are fixed. Forward anchor plate 222 is generally rectangular, and abuts the bottom of drawbar 200, extending laterally across the bottom of drawbar 200 and extending slightly out beyond the left and right sides of drawbar 200.

Bolts 210, 212 extend upward through two openings in the forward anchor plate 222, and are supported in the two openings by hex heads. Bolts 210, 212 extend upward on either side of the drawbar. The upper portion of each of bolts 210, 212 are threaded, and extend through corresponding aligned threaded openings in the forward end of the hammer strap.

Rear anchor plate 224 is generally rectangular and abuts the bottom of drawbar 200, extending laterally across the bottom of drawbar 200 and extending out beyond the left and right sides of drawbar 200 a distance sufficient to support a bolt alongside the drawbar. Rear anchor plate 224 is fixed to drawbar 200 to the rear of forward anchor plate 222.

Bolts 214, 216, 218, 219, and 220 extend upward through five openings in rear anchor plate 224, and are retained in anchor plate 224 by their hex heads. An upper threaded portion of each bolt is threaded into and engages longitudinally aligned threaded holes formed in hammer strap 202.

Bolts 214, 216, 218, 219 and 220 fix hammer strap 202 to drawbar 200 between the clevis portion 204 and the saddle portion 206 of hammer strap 202, leaving the rear end of clevis portion 204 free. Clevis portion 204 includes an upwardly extending portion 226 to which rearwardly extending portion 228 of clevis portion 204 is fixed.

Figure 3:
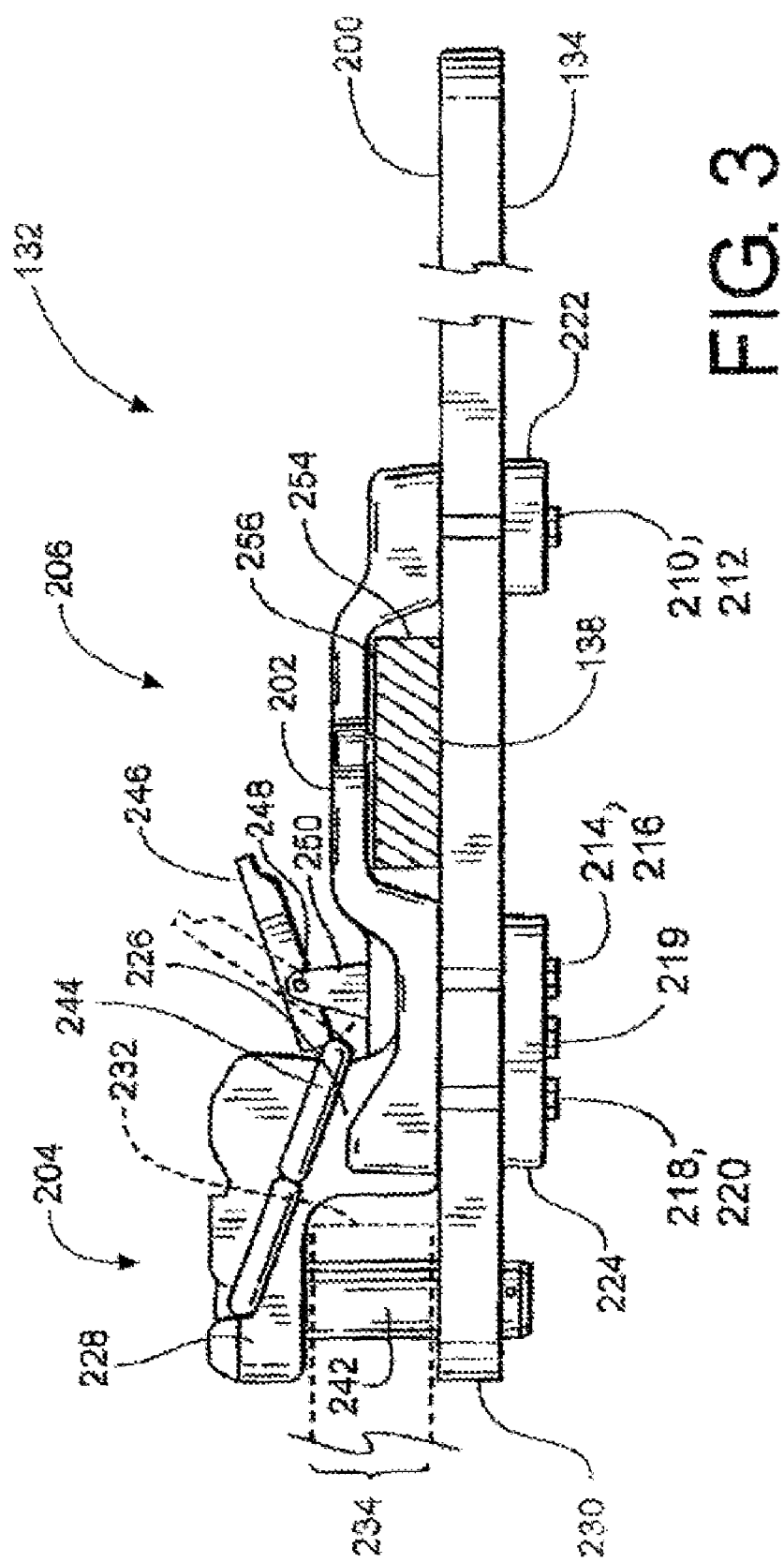
FIG. 3 is a side view of the drawbar assembly of FIGS. 1 and 2.

Rear portion 228 extends backward and generally parallel to rear end 230 of drawbar 200, defining therebetween a gap 234 for receiving the tongue 232 of an implement, shown in FIG. 3 in phantom lines. Rear portion 228 has hole 236 passing therethrough with a vertical axis. Hole 236 is coaxial with hole 238 formed in the rear end 136 of drawbar 200.

Holes 236 and 238 are configured to receive a hitch pin 240, supporting the pin at its upper and lower ends, respectively, and defining between the upper and lower ends an open central region 242 that extends through the tongue of an implement to which the tractor is coupled.

A bail or ring 244 is pivotally coupled to the upper end of hitch pin 240 forming a large oval or rectangular loop. When pin 240 is inserted into holes 236 and 238, ring 244 pivots forward under gravity until it is in the position shown in FIG. 2. As ring 244 pivots forward, it engages an upper surface of latch 246, deflecting one end of latch 246 out of the way. This increases the gap between latch 246 and the upper surface of hammer strap 202 until it is wide enough to pass ring 244 therethrough. This position of latch 246 is shown in FIG. 3 in phantom lines. Ring 244 falls through this widened gap and continues downward until it rests against an upper surface of hammer strap 202, as best shown in FIGS. 2-3. In this position, ring 244 no longer contacts latch 246 which is thereby permitted to pivot back into its original position, as shown in FIGS. 2-3. In this position, pin 240 cannot be lifted out of holes 236, 238. Any attempt to lift pin 240 will fail, since ring 244 cannot be lifted. To release pin 240, the operator raises the forward end of latch 246, thereby pivoting latch 246 about its central pivot point defined by pivot pin 248 to the (phantom line) position shown in FIG. 3.

Latch 246 is supported for rotation on the pivot pin 248. Pivot pin 248, in turn, is supported between two ears 250, 252 of hammer strap 202. Ears 250, 252 are formed integral with and extend upward from the body of hammer strap 202, defining therebetween a gap which receives a central portion of latch 246. Pin 248 permits latch 246 to pivot between ears 250, 252 in the manner described above.

Saddle portion 206 of hammer strap 202 extends generally between forward anchor plate 222 and rear anchor plate 224. This elongated section extends upward and over the top of drawbar hanger 138. Saddle portion 206 is spaced away from the upper surface of drawbar 200 to define a gap 254 therebetween, the gap being dimensioned to accept drawbar hanger 138.

In a preferred embodiment, a polymeric wearing layer 256 is disposed in the gap between drawbar hanger 138 and hammer strap 202 to support the drawbar assembly on drawbar hanger 138, and to permit the operator to pivot the drawbar assembly from side to side. Drawbar hanger 138 has several vertical through-holes 258 that are disposed along its length. Holes 258 are dimensioned to receive pins 260. Pins 260 are inserted into drawbar hanger 138 and have upper portions that extend upward above the top surface of hanger 138. These upper portions of pins 260 interengage with the sides of hammer strap 202 to prevent the hammer strap from pivoting from side to side. One of pins 260 abuts the left side of hammer strap 202 and another of pins 260 abuts the right side of hammer strap 202.

As shown in the foregoing FIGURES, hammer strap 202 extends forward beyond drawbar hanger 138. Bolts 214, 216, 218, 219, 220 fix a central region of hammer strap 202 to drawbar 200 and resist both lateral and longitudinal movement of strap 202 with respect to bar 200.

Bolts 210, 212 fix the forward end of hammer strap 202 to drawbar 200 and resist both lateral and longitudinal movement of strap 202 with respect to bar 200.

When side loads are applied to hitch pin 240, rear bolts 210, 212, 214, 216, 218, 219, 220 located adjacent to pin 240 resist the lateral movement of hammer strap 202.

In prior draw bar assemblies, the hammer strap terminated just forward of (what would be) bolts 214, 216. The bolts in these prior designs were the only ones that fixed their hammer strap to their drawbar. The forces applied to this small pattern of closely-spaced bolts were substantial.

The hammer strap 202 is extended in the present design to a position forward of hanger 138, where it is fixed to drawbar 200 by a bolt 212 on the left side of the drawbar and a bolt 210 on the right side of the drawbar. The addition of bolts 210, 212 located ahead of drawbar hanger 13 significantly reduces loading on bolts 214, 216, 218, 219, 220, particularly when high lateral or longitudinal loads are applied to hammer strap 202.

Figure 6:
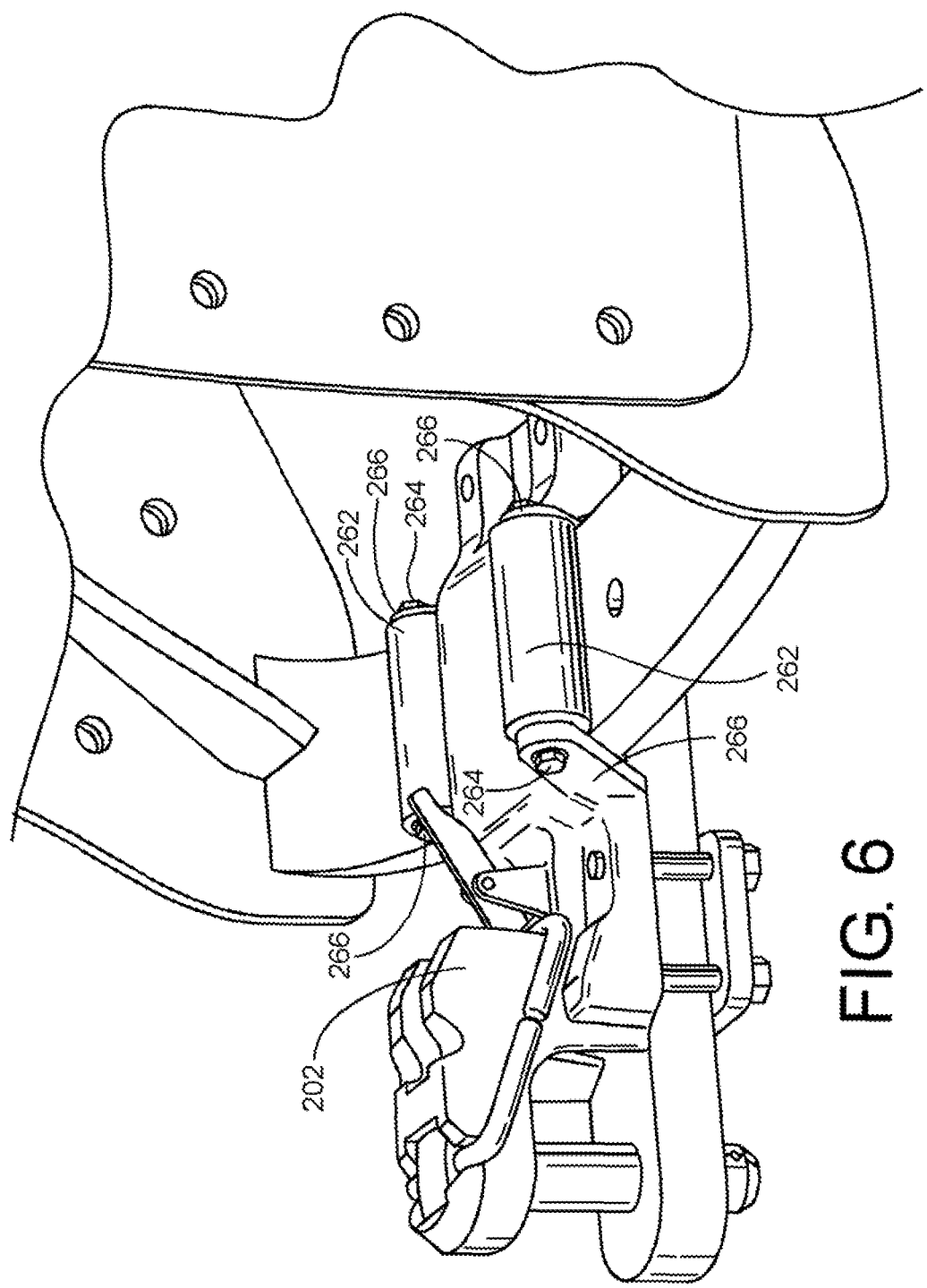
FIG. 6 is a fragmentary perspective view of the hammer strap herein in an alternative configuration having with a pair of rollers.

Referring now to FIG. 6, hammer strap 202 may be provided with two rollers 262 disposed on either side of hammer strap 202. These rollers are supported on pins 264, which in turn are supported on laterally extending flanges 266 to rotate about axes that are parallel to the longitudinal axis of the drawbar. The rollers are positioned such that they rest on the upper surface of drawbar hanger 138 and support the weight of the drawbar. In this manner, the operator can easily pivot the drawbar assembly left and right with respect to the longitudinal axis of the vehicle. Once in the desired position, pins 260 can be inserted into holes 258 and the drawbar assembly 132 fixed in position on the hanger 138.

Figure 7:
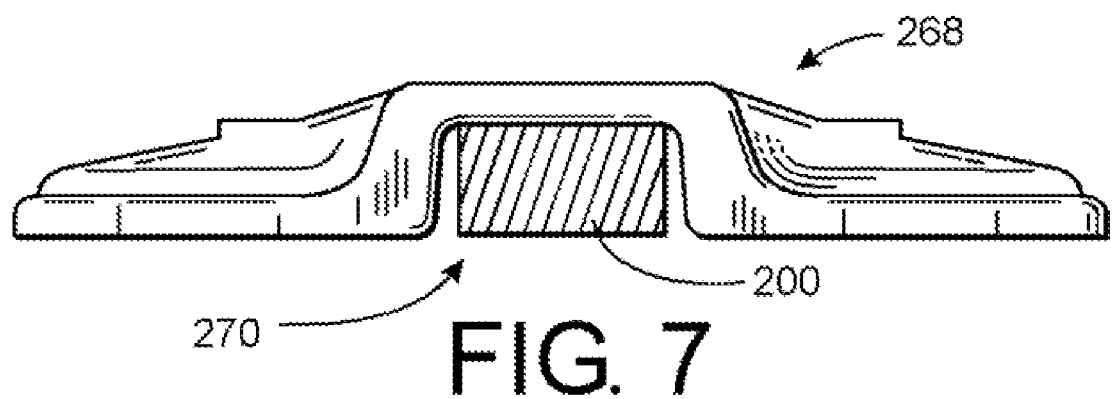
FIGS. 7 and 8 are side and bottom views of a reinforcing brace for the drawbar hanger.
Figure 8:
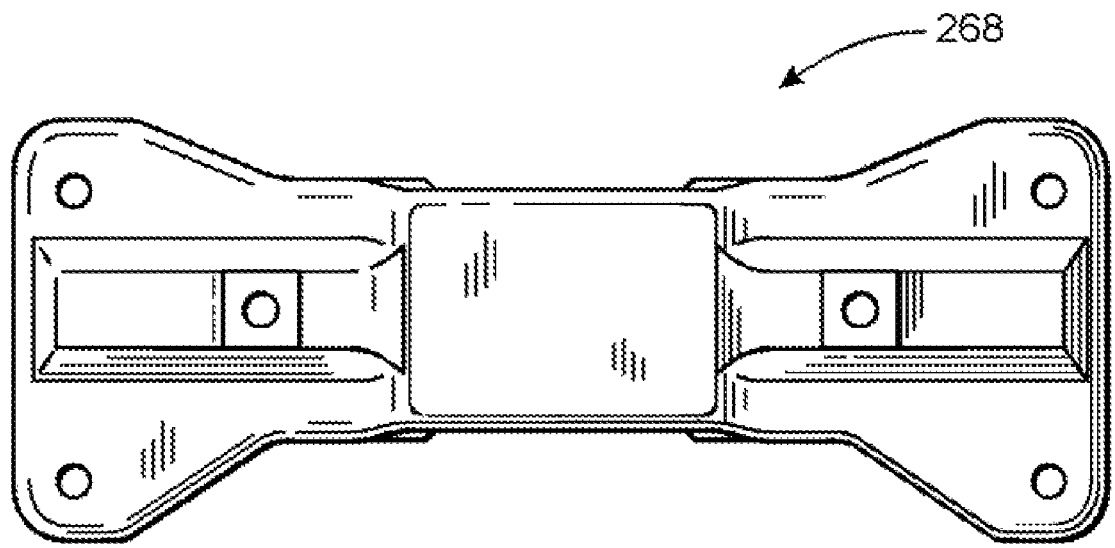
Figure 9:
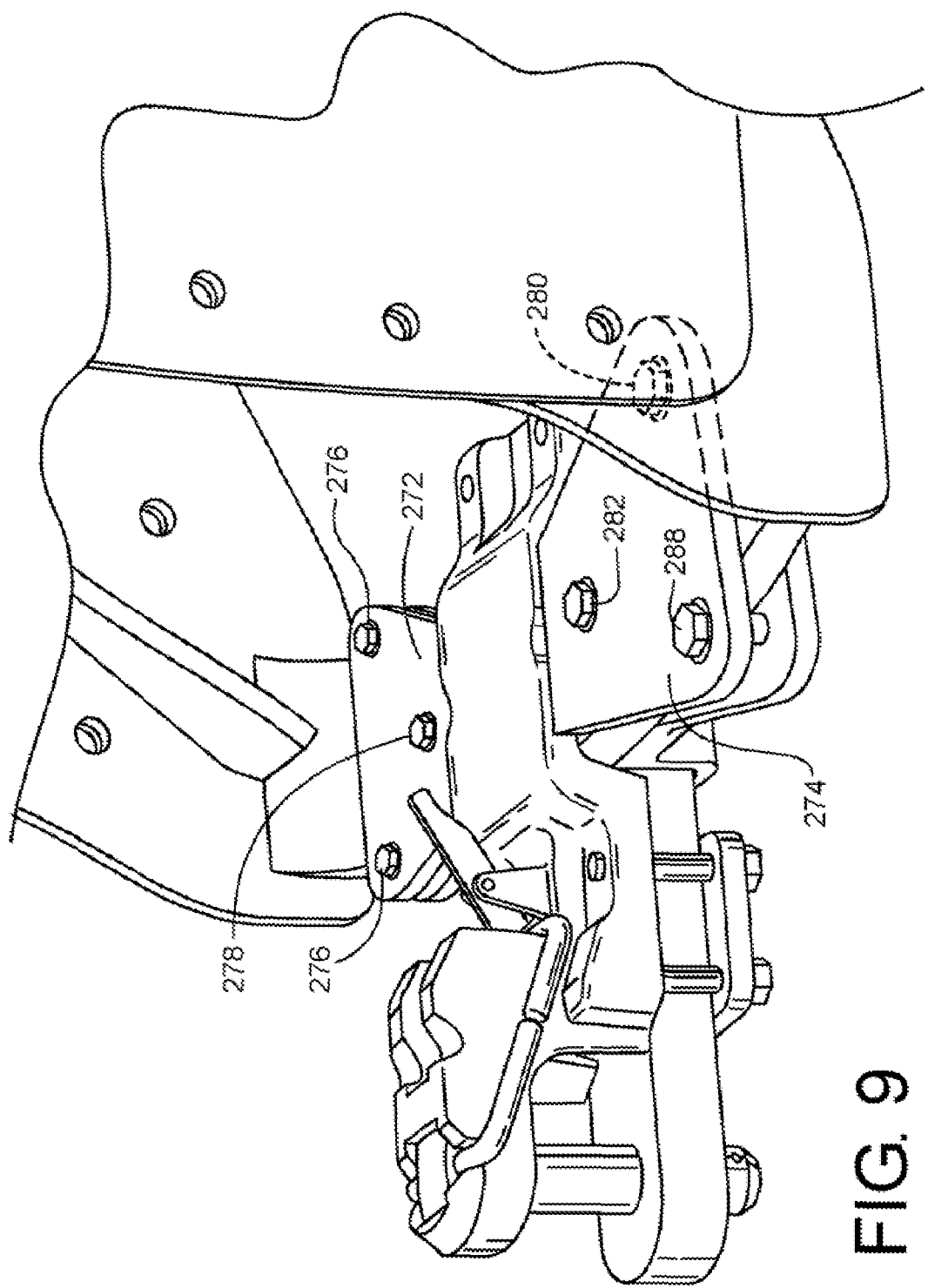
FIG. 9 is a perspective view of the drawbar assembly of FIGS. 1-6 with the reinforcing brace of FIGS. 7-8 fixed to the drawbar hanger.

Referring now to FIGS. 7-9, the drawbar hanger may be reinforced with the addition of an elongated and longitudinally-extending lower brace 268 that is disposed below the drawbar and is fixed to the bottom surface of drawbar hanger 138. Brace 268 preferably defines a recess 270 into which drawbar 200 is disposed. Lower brace 268 is fixed to drawbar hanger 138 on either side of the drawbar 200 by upper braces 272, 274, which are in the form of plates and are disposed on the opposite side (the upper side) of drawbar hanger 138.

A pair of bolts 276 extend through upper brace 272 and are threadedly engaged with lower brace 268. Bolts 276 do not penetrate drawbar hanger 138, but flank it, with one bolt 276 disposed forward of hanger 138 and one bolt 276 disposed aft of hanger 138. A third bolt 278 extends through upper brace 272, through a hole (not shown) in hanger 138, and is fixed to lower brace 268.

In a similar fashion, a pair of bolts 280 extend through upper brace 274 and are threadedly engaged with lower brace 268. Bolts 280 do not penetrate drawbar hanger 138, but flank it, with one bolt 280 disposed forward of hanger 138 and one bolt 280 disposed aft of hanger 138. A third bolt 282 extends through upper brace 274, through a hole (not shown) in hanger 138, and is fixed to lower brace 268.

Bolts 276, 278, 280, 282 are tightened to compress hanger 138 between the upper and lower braces, fixing the braces to the drawbar, and reinforcing the drawbar in its central region.

When side-to-side loads are applied to the rear end of drawbar 200 and hammer strap 202, the walls of recess 270 of lower brace 268 absorb the load and distribute it along lower brace 268 to the ends of brace 268 and to bolts 276, 278, 280, 282, where the load is transferred to hanger 138. The additional support from the braces 268, 274 reduces the deflection of the drawbar hanger 138 and better distributes the load to the endpoints of the hanger 138 where it is fixed to the chassis.

The invention claimed is:

1. A drawbar assembly for an agricultural tractor having a drawbar hanger, the assembly comprising:
    an elongate drawbar having a rear end with a hole configured to receive a lower end of a hitch pin, and a front end pivotally coupled to a tractor chassis; and
    a unitary hammer strap having a front portion and a rear portion, wherein the front portion is fixed to the drawbar forward of the drawbar hanger and the rear portion is configured to receive an upper end of the hitch pin while leaving a central portion of the hitch pin exposed for coupling to a towed implement.

2. The drawbar assembly of claim 1, wherein the hammer strap has a central portion disposed between the front portion and the rear portion that is fixed to the drawbar to the rear of the drawbar hanger.

3. The drawbar assembly of claim 1, wherein the hammer strap defines a laterally extending recess configured to receive the drawbar hanger.

4. The drawbar assembly of claim 1, further comprising:
    the drawbar hanger, the hanger having a bottom surface and a top surface; and
    a laterally extending brace fixed to the bottom surface of the drawbar hanger on both sides of the drawbar.

5. The drawbar assembly of claim 4, wherein the laterally extending brace defines a recess configured to receive the drawbar, the drawbar assembly further comprising:
    a left upper brace fixed to the top surface of the drawbar hanger on the left side of the drawbar; and
    a right upper brace fixed to the top surface of the drawbar hanger on the right side of the drawbar.

6. A drawbar assembly for a work vehicle, comprising:
    a longitudinally-extending drawbar having a rear end with a hole configured to receive a hitch pin, and a front end configured to be coupled to the work vehicle and disposed beneath and perpendicular to an arcuate drawbar hanger; and
    a hammer strap having a front portion and a rear portion, wherein the front portion is fixed to the drawbar forward of the drawbar hanger, and the rear portion is configured to receive the hitch pin, the rear portion being spaced away from the rear end of the drawbar to provide a central exposed portion of the hitch pin.

7. The drawbar assembly of claim 6, wherein the hammer strap comprises a central portion disposed between the front portion and the rear portion that is fixed to the drawbar to the rear of the drawbar hanger.

8. The drawbar assembly of claim 6, wherein the hammer strap defines a laterally extending recess configured to receive the drawbar hanger.

9. The drawbar assembly of claim 6, further comprising:
    the drawbar hanger, the hanger having a bottom surface and a top surface; and
    a laterally extending brace fixed to the bottom surface of the drawbar hanger on both sides of the drawbar.

10. The drawbar assembly of claim 9, wherein the laterally extending brace defines a recess configured to receive the drawbar, the drawbar assembly further comprising:
    a left upper brace fixed to the top surface of the drawbar hanger on the left side of the drawbar; and
    a right upper brace fixed to the top surface of the drawbar hanger on the right side of the drawbar.

11. The drawbar assembly of claim 6, wherein the drawbar has left and right sides, the assembly further comprising:
    a front plate abutting a bottom surface of the drawbar and fixed to the front portion of the hammer strap; and
    a rear plate abutting a bottom surface of the drawbar and fixed to the rear portion of the hammer strap.

12. A drawbar assembly for a work vehicle, comprising:
    a longitudinally-extending drawbar having a rear end configured to receive a hitch pin, and a front end configured to be coupled to the work vehicle; and
    a unitary hammer strap having a front portion and a rear portion, wherein the front portion is bolted to the drawbar at a location forward of a drawbar hanger, and the rear portion is configured to receive the hitch pin, the rear portion being spaced away from the rear end of the drawbar to provide a central exposed portion of the hitch pin.

13. The drawbar assembly of claim 12, wherein the hammer strap comprises a central portion disposed between the front portion and the rear portion that is fixed to the drawbar to the rear of the drawbar hanger.

14. The drawbar assembly of claim 12, wherein the hammer strap defines a laterally extending recess configured to receive the drawbar hanger.

15. The drawbar assembly of claim 12, further comprising:
    the drawbar hanger, the hanger having a bottom surface and a top surface; and
    a laterally extending brace fixed to the bottom surface of the drawbar hanger on both sides of the drawbar.

16. The drawbar assembly of claim 15, wherein the laterally extending brace defines a recess configured to receive the drawbar, the drawbar assembly further comprising:
    a left upper brace fixed to the top surface of the drawbar hanger on the left side of the drawbar; and
    a right upper brace fixed to the top surface of the drawbar hanger on the right side of the drawbar.

17. The drawbar assembly of claim 12, wherein the drawbar has left and right sides, the assembly further comprising:
    a front plate abutting a bottom surface of the drawbar and fixed to the front portion of the hammer strap; and
    a rear plate abutting a bottom surface of the drawbar and fixed to the rear portion of the hammer strap.

18. The drawbar assembly of claim 12, wherein the hitch pin includes a pin portion and a handle portion pivotally coupled to the pin portion, and further wherein the drawbar assembly further comprises a releasable latch configured to lock the handle portion.

19. The drawbar assembly of claim 18, wherein the latch comprises a latch member pivotally coupled to the hammer strap.

* * * * *